(12) United States Patent
Norberg et al.

(10) Patent No.: US 11,667,194 B2
(45) Date of Patent: Jun. 6, 2023

(54) POWER TAKE-OFF ARRANGEMENT, POWERTRAIN, AND VEHICLE

(71) Applicant: Scania CV AB, Södertälje (SE)

(72) Inventors: Peer Norberg, Hagersten (SE); Per Arnelöf, Vendelsö (SE); Daniel Petersen, Södertälje (SE)

(73) Assignee: Scania CV AB, Södertälje (SE)

( * ) Notice: Subject to any disclaimer, the term of this patent is extended or adjusted under 35 U.S.C. 154(b) by 870 days.

(21) Appl. No.: 16/611,499

(22) PCT Filed: May 14, 2018

(86) PCT No.: PCT/SE2018/050494
§ 371 (c)(1),
(2) Date: Nov. 7, 2019

(87) PCT Pub. No.: WO2018/212702
PCT Pub. Date: Nov. 22, 2018

(65) Prior Publication Data
US 2020/0114760 A1     Apr. 16, 2020

(30) Foreign Application Priority Data

May 16, 2017 (SE) .................... 1750602-3

(51) Int. Cl.
*B60K 25/06* (2006.01)
*B60W 10/02* (2006.01)
(Continued)

(52) U.S. Cl.
CPC ............. *B60K 25/06* (2013.01); *B60W 10/02* (2013.01); *F16H 61/684* (2013.01); *B60K 2025/065* (2013.01); *F16H 2061/0455* (2013.01)

(58) Field of Classification Search
CPC ....... B60K 17/04; B60K 25/06; B60W 10/02; B60W 30/1888; F16H 61/684; B60Y 2400/795; F16D 2500/10437
See application file for complete search history.

(56) References Cited

U.S. PATENT DOCUMENTS 4,233,857 A   11/1980  Quick
5,826,460 A   10/1998  Soncina
(Continued)

FOREIGN PATENT DOCUMENTS

CN   1991193 A    7/2007
CN   104040207 A  9/2014
(Continued)

OTHER PUBLICATIONS

May 6, 2022—(CN) First Office Action—App. No. 201880031110.0.
(Continued)

*Primary Examiner* — Karen Beck
(74) *Attorney, Agent, or Firm* — Banner & Witcoff, Ltd.

(57) ABSTRACT

A power take-off arrangement (1) for a vehicle (5) that includes an input shaft (7), a main transmission member (9), a main coupling device (11), a first power take-off unit (13), a second power take-off unit (17), a first coupling device (15), and a second coupling device (19). The first coupling device (15) and the second coupling device (19) are configured to connect, in an engaged state, a respective power take-off unit (13, 17) to the main transmission member (9). The first and second coupling devices (15, 19) are connected to the main coupling device (11) such that the main coupling device (11) is controlled to be in the engaged state when any one of the first and second coupling devices (15, 19) is in the engaged state.

15 Claims, 2 Drawing Sheets

(51) Int. Cl.
  *F16H 61/684* (2006.01)
  *F16H 61/04* (2006.01)

(56) References Cited

U.S. PATENT DOCUMENTS

| | | | |
|---|---|---|---|
| 2005/0072254 | A1 | 4/2005 | Kramer |
| 2008/0000322 | A1 | 1/2008 | Hillyer et al. |
| 2019/0337376 | A1* | 11/2019 | Ore .................. B60K 6/365 |
| 2021/0062901 | A1* | 3/2021 | Ozawa .................. F16H 37/084 |

FOREIGN PATENT DOCUMENTS

| | | |
|---|---|---|
| CN | 105228847 A | 1/2016 |
| CN | 205296036 U | 6/2016 |
| DE | 267021 C | 11/1913 |
| EP | 1400716 A1 | 3/2004 |
| EP | 2 681 983 A1 | 1/2014 |
| JP | 2007161025 A | 6/2007 |
| JP | 2007177907 A | 7/2007 |
| WO | 2002055903 A2 | 7/2002 |
| WO | WO 2014/189456 A1 | 11/2014 |

OTHER PUBLICATIONS

European Search Report, dated Jan. 21, 2021, issued in corresponding European Patent Application No. 18802038.2. Total 8 pages.
Sep. 7, 2022—(BR) Office Action—App. No. BR112019023476-4.
Jan. 21, 2021—(EP) Extended European Search Report—App. No. 18802038.2.
Jan. 28, 2022—(EP) Communication under Rule 71(3) EPC—Intention to Grant—App. No. 18802038.2.
Novelty Search Report dated Nov. 9, 2016.
Office Action dated Dec. 12, 2017 in corresponding Swedish Patent Application No. 1750602-3.
International Search Report dated Jun. 26, 2018 in corresponding PCT International Application No. PCT/SE2018/050494.
Written Opinion dated Jun. 26, 2018 in corresponding PCT International Application No. PCT/SE2018/050494.

* cited by examiner

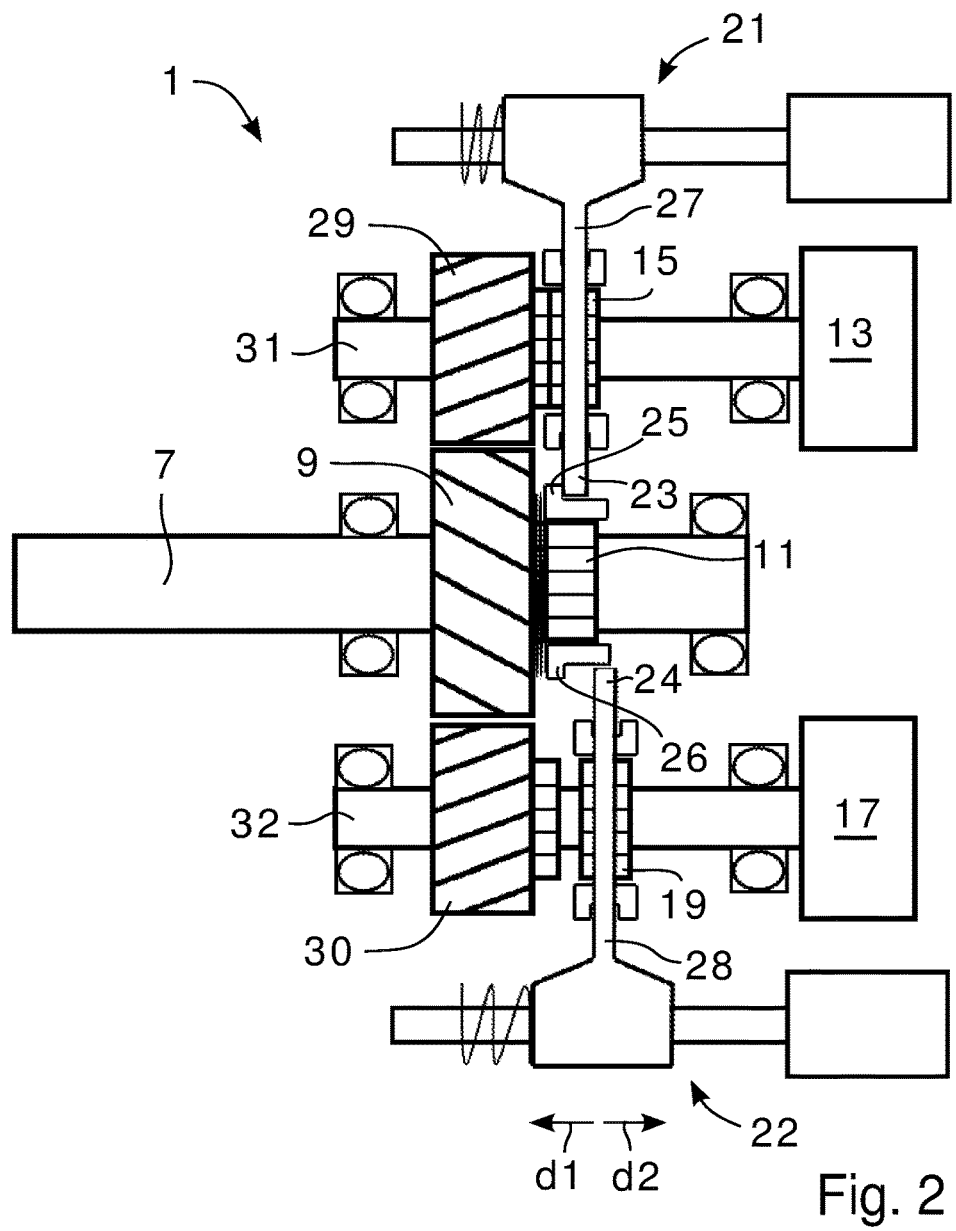
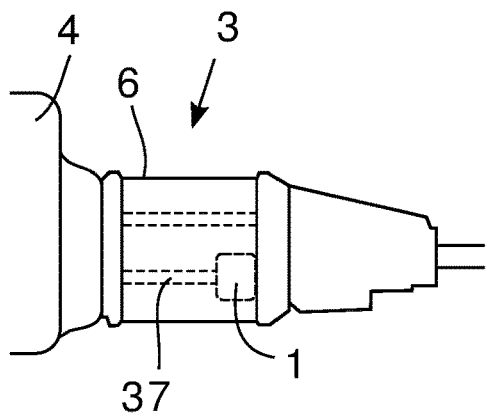
Fig. 3
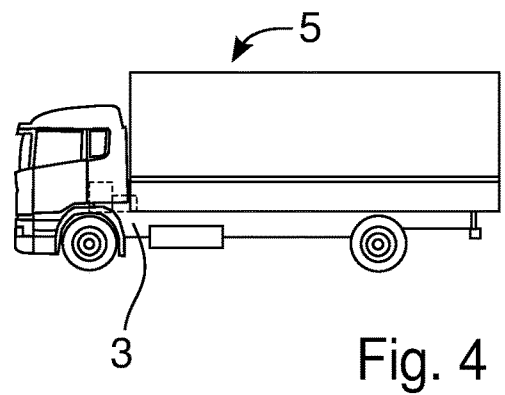
Fig. 4

POWER TAKE-OFF ARRANGEMENT, POWERTRAIN, AND VEHICLE

CROSS-REFERENCE TO RELATED APPLICATIONS

The present application is a 35 U.S.C. § 371 national phase conversion of PCT/SE2018/050494, filed May 14, 2018, which claims priority of Swedish Patent Application No. 1750602-3, filed May 16, 2017, the contents of all of which are incorporated herein by reference. The PCT International Application was published in the English language.

TECHNICAL FIELD

The present invention relates to a power take-off arrangement for a vehicle. The present invention further relates to a powertrain for a vehicle, as well as a vehicle comprising a powertrain.

BACKGROUND

A power take-off arrangement, generally abbreviated as PTO, is an arrangement for taking power from a propulsion unit of a vehicle, such as a running engine, and transmitting it to a second unit such as an attached implement or a separate machine. Most PTO arrangements comprise an input shaft connected to a shaft of a powertrain of the vehicle, such as a lay shaft of a gearbox of the vehicle. Some PTO arrangements comprise a PTO unit in the form of a splined output shaft designed so that an input shaft of a second unit can be easily connected to the splined output shaft. As an alternative to the splined output shaft, or in addition thereto, a PTO arrangement may comprise a PTO unit in the form of a hydraulic pump, or a similar component. The hydraulic pump may be connected to, and drive, a temporarily attached hydraulic unit, and/or a hydraulic unit permanently arranged at the vehicle, such as a hydraulic unit configured to tilt a tipper body of a tipper truck, a crane, or the like. A common feature of the above-described PTO arrangements is that they allow implements to draw energy from a power source of a vehicle, such as an engine.

Some vehicles, such as heavy trucks, comprise two or more PTO units. Such two or more PTO units are preferably individually disconnectable from the power source in order to a) be able to use one PTO unit at the time, b) to lower losses when a PTO unit is not in use, and c) not cause any parts of the PTO unit to move when the PTO unit is not in use. As is well known, environmental concerns require an efficient use of power of a power source of a vehicle. The technology development in the vehicle industry has led to increasingly energy efficient vehicles, which is an important aspect for the future, also for vehicles which are at least partially driven by an electric machine.

The addition of different functions and components to a vehicle usually adds cost and weight to the vehicle and takes up space. In addition, generally, today's consumer market requires high quality products that can be manufactured in a cost-efficient manner, while being reliable and durable.

SUMMARY

It is an object of the present invention to overcome, or at least alleviate, at least some of the above-mentioned problems.

According to a first aspect of the invention, the object is achieved by a power take-off arrangement for a vehicle. The arrangement comprises an input shaft, a main transmission member and a main coupling device. The main coupling device is configured to, in an engaged state, connect the main transmission member to the input shaft. The arrangement further comprises a first power take-off unit and a first coupling device. The first coupling device is configured to, in an engaged state, connect the first power take-off unit to the main transmission member. The arrangement further comprises a second power take-off unit and a second coupling device. The second coupling device is configured to, in an engaged state, connect the second power take-off unit to the main transmission member. The first and second coupling devices are connected to the main coupling device such that the main coupling device is controlled to be in the engaged state when any one of the first and second coupling devices is in the engaged state.

Thereby, a power take-off arrangement is provided in which the main coupling device is controlled to be in the engaged state when any one of the first and second coupling devices is in the engaged state, i.e. when any one of the first and second power take-off units is in use. Thereby, the need for a separate actuator controlling engagement of the main coupling device is circumvented. Instead, as an example, by arranging a first actuator controlling engagement of the first coupling device and a second actuator controlling engagement of the second coupling device, an arrangement is provided comprising only two actuators capable of controlling engagement of three different coupling devices.

As a result, a less complex arrangement is provided comprising fewer parts. Thus, an arrangement is provided that can be manufactured in a cost-efficient manner, while saving space and weight.

Accordingly, an arrangement is provided to overcome, or at least alleviate, at least some of the above-mentioned problems. As a result, the above-mentioned object is achieved.

Optionally, the main coupling device is arranged to assume a disengaged state when all of the first and second coupling devices are in a disengaged state. Thereby, an arrangement is provided that automatically disconnects the main transmission member from the input shaft when all of the first and second coupling devices are in a disengaged state, i.e. when all of the first and second the first and second power take-off units are not in use. Thereby, the need for a separate actuator controlling the main coupling device to the disengaged state is circumvented. In addition, losses caused by the arrangement, when not in use, are minimized in a simple and efficient manner since the main transmission member is disconnected from the input shaft when all of the first and second coupling devices are in a disengaged state. As a result, an arrangement is provided that potentially reduces consumption of power of a powertrain comprising the arrangement.

Optionally, the arrangement further comprises a first actuator configured to control the first coupling device between a disengaged state and the engaged state, and a second actuator configured to control the second coupling device between a disengaged state and the engaged state, wherein the first coupling device is connected to the main coupling device via a first portion of the first actuator, and the second coupling device is connected to the main coupling device via a second portion of the second actuator. Thereby, a power take-off arrangement is provided which comprises two actuators capable of controlling engagement of three different coupling devices in a simple and efficient manner. Further, a power take-off arrangement is provided that saves space, cost and weight.

Optionally, the connection between the first portion and the main coupling device is such that the first portion abuts against a portion of the main coupling device, at least when the first coupling device is in the engaged state, and wherein the connection between the second portion and the main coupling device is such that the second portion abuts against a portion of the main coupling device, at least when the second coupling device is in the engaged state. Thereby, the connections are provided in a simple and efficient manner. Thus, the above given advantage of being capable of controlling engagement of three different coupling devices using two actuators is achieved in a simple, reliable and efficient manner.

Optionally, the first actuator comprises a first actuator arm, and the second actuator comprises a second actuator arm, wherein the first portion is a portion of the first actuator arm, and wherein the second portion is a portion of the second actuator arm. Thereby, the connections are provided in a simple and efficient manner. Thus, the above given advantage of being capable of controlling engagement of three different coupling devices using two actuators is achieved in a simple, reliable and efficient manner.

Optionally, the first actuator is configured to control the first coupling device from the disengaged state to the engaged state by displacing the first coupling device in a first direction, wherein the second actuator is configured to control the second coupling device from the disengaged state to the engaged state by displacing the second coupling device in the first direction, and wherein the main coupling device is arranged to assume the engaged state by being displaced in the first direction. Thereby, an arrangement is provided that is capable of controlling engagement of three different coupling devices using two actuators in a simple, reliable and efficient manner.

Optionally, the main coupling device is biased in a second direction being opposite to the first direction. Thereby, the main coupling device will disconnect the main transmission member from the input shaft, when all of the first and second coupling devices are in a disengaged state, in a simple, reliable and efficient manner. Accordingly, also the need for a separate actuator controlling the main coupling device to the disengaged state is circumvented.

Optionally, the arrangement further comprises a first transmission member and a second transmission member each being connected to the main transmission member. Further, the arrangement may comprise a first shaft connected to the first power take-off unit, and a second shaft connected to the second power take-off unit. The first coupling device may be configured to connect the first power take-off unit to the main transmission member by connecting the first transmission member to the first shaft, and the second coupling device may be configured to connect the second power take-off unit to the main transmission member by connecting the second transmission member to the second shaft.

Thereby, the first and second power take-off units can be connected to the main transmission member in a simple and reliable manner.

Optionally, the main transmission member, the first transmission member and second transmission member each comprises a gear wheel. Thereby, transfer of power from the input shaft to the respective power take-off unit can be performed in a simple, efficient and reliable manner.

Optionally, the input shaft, the first shaft and the second shaft are arranged in parallel. Thereby, transfer of power from the input shaft to the respective power take-off unit can be performed in a simple, efficient and reliable manner. Further, a compact power take-off arrangement can be provided.

Optionally, at least a portion of the input shaft is arranged between the first shaft and the second shaft. Thereby, transfer of power from the input shaft to the respective power take-off unit can be performed in a simple, efficient and reliable manner. Further, a compact power take-off arrangement can be provided since space is utilized in an efficient manner.

Optionally, the first coupling device is slidably arranged at the first shaft, the second coupling device is slidably arranged at the second shaft and the main coupling device is slidably arranged at the input shaft. Thereby, engagement of the respective coupling device can be performed in a simple, reliable and efficient manner. Further, since the respective coupling device is slidably arranged at the respective shaft, less complex actuators can be used for controlling engagement of the coupling devices. For example, an actuator can be used that only operates in one or two directions for displacing a respective coupling device.

Optionally, the main coupling device and the first and second coupling devices, each comprises a dog clutch. Thereby, engagement of the respective coupling device can be performed in a simple, reliable and efficient manner. Further, since the respective coupling device comprises a dog clutch, less complex actuators can be used for controlling engagement of the coupling devices. For example, an actuator can be used that only operates in one or two directions for displacing a portion of the respective dog clutch.

According to a second aspect of the invention, the object is achieved by a powertrain for a vehicle, wherein the powertrain comprises a power source and a transmission, wherein the power source is configured to provide motive power to the vehicle via the transmission, and wherein the powertrain comprises a power take-off arrangement according to some embodiments, wherein the input shaft of the power take-off arrangement is connected to a shaft of the powertrain. Since the powertrain comprises a power take-off arrangement overcoming, or at least alleviating, at least some of the above-mentioned problems, a powertrain is provided that overcomes, or at least alleviates, at least some of the above-mentioned problems.

As a result, the above-mentioned object is achieved.

According to a third aspect of the invention, the object is achieved by a vehicle comprising a powertrain as claimed. Since the vehicle comprises a powertrain that overcomes, or at least alleviates, at least some of the above-mentioned problems, a vehicle is provided that overcomes, or at least alleviates, at least some of the above-mentioned problems.

As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIG. 2 illustrates the power take-off arrangement illustrated in FIG. 1 with the first coupling device in the engaged state, FIG. 3 illustrates a powertrain for a vehicle, and FIG. 4 illustrates a vehicle comprising the powertrain illustrated in FIG. 3.

DETAILED DESCRIPTION

Figure 1:
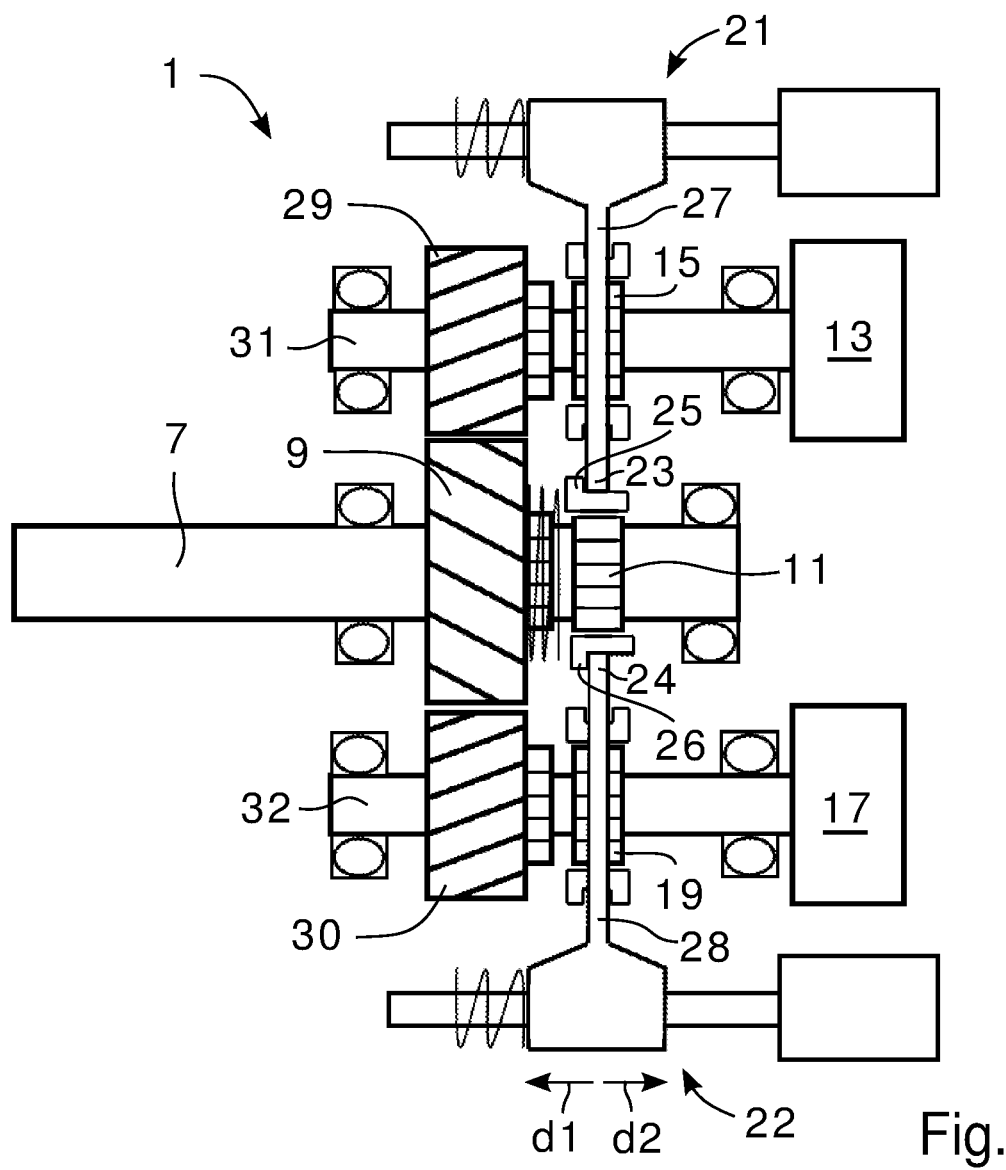
FIG. 1 schematically illustrates a power take-off arrangement, according to some embodiments.

Aspects of the present invention will now be described more fully. Like numbers refer to like elements throughout. Well-known functions or constructions will not necessarily be described in detail for brevity and/or clarity.

FIG. 1 schematically illustrates a power take-off arrangement 1, according to some embodiments. The arrangement 1 comprises an input shaft 7, a main transmission member 9 and a main coupling device 11. The main coupling device 11 is configured to connect, in an engaged state, the main transmission member 9 to the input shaft 7. According to the embodiments illustrated in FIG. 1, the main transmission member 9 comprises a gearwheel. Further, according to the illustrated embodiments, the arrangement 1 comprises a first transmission member 29 and a second transmission member 30, each comprising a gear wheel arranged to engage with the gear wheel of the main transmission member 9. The arrangement 1 further comprises a first power take-off unit 13, a first coupling device 15, a second power take-off unit 17, and a second coupling device 19.

According to the illustrated embodiments, the arrangement 1 comprises a first shaft 31 connected to the first power take-off unit 13 and a second shaft 32 connected to the second power take-off unit 17. The first transmission member 29 is rotatably arranged at the first shaft 31, the second transmission member 30 is rotatably arranged at the second shaft 32 and the main transmission member 9 is rotatably arranged at the input shaft 7.

The first coupling device 15 is configured to connect, in an engaged state, the first power take-off unit 13 to the main transmission member 9. The second coupling device 19 is configured to connect, in an engaged state, the second power take-off unit 17 to the main transmission member 9. According to the illustrated embodiments, the first coupling device 15 is configured to connect the first power take-off unit 13 to the main transmission member 9 by connecting the first transmission member 29 to the first shaft 31. Likewise, the second coupling device 19 is configured to connect the second power take-off unit 17 to the main transmission member 9 by connecting the second transmission member 30 to the second shaft 32.

In FIG. 1, all of the main coupling device 11, the first coupling device 15 and the second coupling device 19 are illustrated in a disengaged state. According to the illustrated embodiments, the first coupling device 15 is slidably arranged at the first shaft 31, the second coupling device 19 is slidably arranged at the second shaft 32, and the main coupling device 11 is slidably arranged at the input shaft 7. According to the illustrated embodiments, the main coupling device 11 and the first and second coupling devices 15, 19 each comprises a dog clutch. However, one or more of the main coupling device 11 and the first and second coupling devices 15, 19 may comprise another type of coupling device, such as a disc coupling or cone coupling.

The first and second coupling devices 15, 19 are connected to the main coupling device 11 such that the main coupling device 11 is controlled to be in the engaged state when any one of the first and second coupling devices 15, 19 is in the engaged state. In the engaged state, the main coupling device 11 rotationally locks the main transmission member 11 to the input shaft 7.

Thereby, the need for a separate actuator controlling engagement of the main coupling device 11 is circumvented. Instead, as illustrated in FIG. 1, the arrangement 1 may comprise a first actuator 21 and a second actuator 22. The first actuator 21 is configured to control the first coupling device 15 between a disengaged state and the engaged state. When the first coupling device 15 is in the disengaged state, the first transmission member 29 may rotate relative to the first shaft. When the first coupling device 15 is in the engaged state, the first coupling device 15 rotationally locks the first transmission member 29 to the first shaft 31.

Likewise, the second actuator 22 is configured to control the second coupling device 19 between a disengaged state and the engaged state. When the second coupling device 19 is in the disengaged state, the second transmission member 30 may rotate relative to the second shaft 32. When the second coupling device 19 is in the engaged state, the second coupling device 19 rotationally locks the second transmission member 30 to the second shaft 32.

The first actuator 21 is configured to control the first coupling device 15 from the disengaged state to the engaged state by displacing the first coupling device 15 in a first direction d1.

FIG. 2 illustrates the power take-off arrangement 1 illustrated in FIG. 1 with the first coupling device 15 in the engaged state. Further, the first coupling device 15 is connected to the main coupling device 11 such that the main coupling device 11 is controlled to be in the engaged state when the first coupling device 15 is in the engaged state. Thus, upon displacement of the first coupling device 15 from the disengaged state, illustrated in FIG. 1, to the engaged state, illustrated in FIG. 2, the main coupling device 11 is displaced to the engaged state because the main coupling device 11, according to the illustrated embodiments, is arranged to assume the engaged state by being displaced in the first direction d1. As a result, the main transmission member 9 is rotationally locked to the input shaft 7 and the first transmission member 29 is rotationally locked to the first shaft 31, when the first coupling device 15 is in the engaged state. Thereby, torque can be transferred from the input shaft 7 to the first power take-off unit 13.

The first actuator 21 comprises a first actuator arm 27. The first coupling device 15 is connected to the main coupling device 11 via a first portion 23 of the first actuator arm 27. The connection between the first portion 23 of the first actuator arm 27 and the main coupling device 11 is such that the first portion 23 abuts against a portion 25 of the main coupling device 11, at least when the first coupling device 15 is in the engaged state. For example, as seen in FIG. 2, the first portion 23 of the first actuator arm 27 abuts against the main coupling device 11 when the first coupling device 15 is in the engaged state.

According to the illustrated embodiments, the second actuator 22 and the second coupling device 19 are of identical, but mirrored, design as the first actuator 21 and the first coupling device 15. Thus, the second actuator 22 comprises a second actuator arm 28, wherein the second coupling device 19 is connected to the main coupling device 11 via a second portion 24 of the second actuator arm 28, in a corresponding manner as described above with reference to the first actuator arm 27.

According to the illustrated embodiments, the first actuator arm 27 and the second actuator arm 28 are arranged such that they only may transfer force onto the main coupling device 11 in the first direction d1. According to the illustrated embodiments, the second portion 24 of the second actuator arm 28 do not abut against the main coupling device 11 because the first coupling device 15 is in the engaged state and the second coupling device 19 is in the disengaged state.

When the first coupling device 15 is in the engaged state, and accordingly the main coupling device 11 is in the engaged state, but the second coupling device 19 is in the disengaged state, as illustrated in FIG. 2, no torque is transferred to the second power take-off unit 17 since the second transmission member 30 may rotate relative the second shaft 32. However, the second actuator 22 may control the second coupling device 19 from the disengaged state to the engaged state by displacing the second coupling device 19 in the first direction d1. When the second coupling device 19 and the first coupling device 15 are in the engaged state, torque can be transferred from the input shaft 7 to the second power take-off unit 17, as well as to the first power take-off unit 13.

When one of the actuators 21, 22 is controlling one of the coupling devices 15, 19 to the disengaged state, the main coupling device 11 will remain in the engaged state. For example, if the first actuator 21 is controlling the first coupling device 15 to the disengaged state, the main coupling device 11 will remain in the engaged state, since the second portion 24 of the second actuator arm 28 will abut against the main coupling device 11. When also the second actuator 24 is controlling the second coupling device 19 to the disengaged state, by displacing the second actuator arm 28 in the second direction d2, and thus also the second coupling device 19, in the second direction d2, the main coupling device 11 will assume the disengaged state. Thereby, losses caused by the arrangement 1 are minimized when none of the power take-off units 13, 17 are in use. The main coupling device 11 will assume the disengaged state since the main coupling device 11 is arranged to assume a disengaged state when all of the first and second coupling devices 15, 19 are in a disengaged state. According to the illustrated embodiments, this is achieved by the main coupling device 11 being biased in the second direction d2 by a spring. According to the illustrated embodiments, the first direction d1 is a direction towards the respective transmission unit 29, 32, 11, and the second direction d2 is opposite to the first direction d1, i.e. a direction from the respective transmission unit 29, 32, 11.

Since the second actuator 22 and the second coupling device 19 are of identical, but mirrored, design as the first actuator 21 and the first coupling device 15, the features described herein applies mutatis mutandis if the second actuator 22 and the second coupling device 19 are supplemented with the first actuator 21 and the first coupling device 15, and vice versa. In addition, all possible combinations of engaged and disengaged first and second coupling devices 15, 19 are not illustrated in the figures and described in detail herein for the reason of brevity and/or clarity. According to the illustrated embodiments, the possible combinations of engaged and disengaged states of the first and second coupling devices 15, 19 are:

1. The first and second coupling devices 15, 19 in the disengaged state, as illustrated in FIG. 1,
2. The first coupling device 15 in the engaged state and the second coupling device 19 in the disengaged state, as illustrated in FIG. 2,
3. The second coupling device 19 in the engaged state and the first coupling device 15 in the disengaged state, not illustrated, and
4. The first and second coupling devices 15, 19 in the engaged state, not illustrated.

Since the main coupling device 11 is arranged to assume the disengaged state when all of the first and second coupling devices 15, 19 are in a disengaged state, the main coupling device 11 will be in the disengaged state in the combination 1 above.

Since the first and second coupling devices 15, 19 are connected to the main coupling device 11 such that the main coupling device 11 is controlled to be in the engaged state when any one of the first and second coupling devices 15, 19 is in the engaged state, the main coupling device 11 will be in the engaged state in the combinations 2-4 above.

The first and/or second actuator 21, 22 may comprise a pneumatic, a hydraulic, or an electric actuator. The first and/or second actuator 21, 22 may be arranged to displace the respective actuator arm 27, 28 in the first direction d1 and in the second direction d2. As an alternative, the first and/or second actuator 21, 22 may be arranged to displace the respective actuator arm 27, 28 in one of the first and second directions d1, d2, wherein the respective actuator arm 27, 28 is biased in the other direction of the first and second directions d1, d2.

According to the illustrated embodiments, at least a portion of the input shaft 7 is arranged between the first shaft 31 and the second shaft 32. Further, the input shaft 7, the first shaft 31 and the second shaft 32 are arranged in parallel. However, the shafts 7, 31, 32 may not be arranged in parallel, for example, one or more of the main transmission member 9, the first transmission member 29 and the second transmission member 30 may comprise a bevelled gear.

According to still further embodiments, the power take-off arrangement 1 may comprise more than two power take-off units 13, 17, such as three, four, five, or six power take-off units. According to such embodiments, each power take-off unit may be connected to the main transmission member 9, for example, via a gear. Further, each power take-off unit may comprise a coupling device connected to the main coupling device 11 such that the main coupling device 11 is controlled to be in the engaged state when the coupling device is in the engaged state. Each power take-off unit may comprise an actuator arranged to control the coupling device between an engaged state and a disengaged state. In such embodiments, the connection may, as the illustrated embodiments, comprise a portion of an actuator arm of the actuator.

The connection between the first and second coupling devices 15, 19 and the main coupling device 11, as well as the connection between further coupling devices and the main coupling device 11, may comprise a linkage ensuring that the main coupling device 11 is controlled to be in the engaged state when any one of the coupling devices is in the engaged state, and ensuring that main coupling device 11 assumes the disengaged state when all coupling devices are in the disengaged state. Such a linkage may be a mechanical linkage, a pneumatic linkage, a hydraulic linkage, and/or a magnetic linkage.

FIG. 3 illustrates a powertrain 3 for a vehicle. The powertrain 3 comprises a power source 4 and a transmission 6. The power source 4 may comprise a combustion engine, such as a diesel engine or an Otto engine configured to operate on gasoline, ethanol, or similar volatile fuel. As an alternative, or in addition thereto, the power source 4 may comprise one or more electric machines. The transmission may comprise a clutch, a gear box, one or more shafts, and one or more differentials being arranged to transfer power from the power source 4 to one or more wheels of a vehicle.

FIG. 4 illustrates a vehicle 5 comprising the powertrain 3 illustrated in FIG. 1. The power source 4 of the powertrain 3, illustrated in FIG. 3, is configured to provide motive power to the vehicle 5 via the transmission 6.

The powertrain 3 illustrated in FIG. 3 comprises a power take-off arrangement 1 as illustrated in FIG. 1 and FIG. 2. The input shaft 7 of the power take-off arrangement 1 is connected to a shaft 37 of the powertrain 3. According to the illustrated embodiments, the input shaft 7 of the power take-off arrangement 1 is connected to a lay shaft 37 of the transmission 6. However, the input shaft 7 of the power take-off arrangement 1 may be connected to another type of shaft of the powertrain 3, such as a shaft of the power source 4 or a shaft of the transmission 6.

The vehicle 5 illustrated in FIG. 4 is a truck. However, the powertrain 3, and thus also the power take-off arrangement 1, may be in another type of manned or unmanned vehicle for land or water based propulsion such as a lorry, a bus, a construction vehicle, a tractor, a car, a ship, a boat, etc.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The terms engaged and disengaged state, may also be referred to as the engaged and disengaged position. The terms first actuator arm and second actuator arm may also be referred to as a first actuator fork and a second actuator fork.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A power take-off arrangement for a vehicle, comprising:
   an input shaft, a main transmission member and a main coupling device, wherein the main coupling device is configured to connect, in an engaged state, the main transmission member to the input shaft,
   a first power take-off unit and a first coupling device, wherein the first coupling device is configured to connect, in an engaged state, the first power take-off unit to the main transmission member,
   a second power take-off unit and a second coupling device, wherein the second coupling device is configured to connect, in an engaged state, the second power take-off unit to the main transmission member,
   wherein the first and second coupling devices are connected to the main coupling device such that the main coupling device is controlled to be in the engaged state when any one of the first and second coupling devices is in the engaged state.

2. The arrangement according to claim 1, wherein the main coupling device is arranged to be in a disengaged state when all of the first and second coupling devices are in a disengaged state.

3. The arrangement according to claim 1, further comprising:
   a first actuator configured to control the first coupling device between a disengaged state and the engaged state, and
   a second actuator configured to control the second coupling device between a disengaged state and the engaged state,
   wherein the first coupling device is connected to the main coupling device via a first portion of the first actuator, and wherein the second coupling device is connected to the main coupling device via a second portion of the second actuator.

4. The arrangement according to claim 3, wherein the connection between the first portion and the main coupling device is such that the first portion abuts against a portion of the main coupling device, at least when the first coupling device is in the engaged state, and
   wherein the connection between the second portion and the main coupling device is such that the second portion abuts against a portion of the main coupling device, at least when the second coupling device is in the engaged state.

5. The arrangement according to claim 3, wherein the first actuator comprises a first actuator arm, and the second actuator comprises a second actuator arm, wherein the first portion is a portion of the first actuator arm, and wherein the second portion is a portion of the second actuator arm.

6. The arrangement according to claim 3, wherein the first actuator is configured to control the first coupling device from the disengaged state to the engaged state by displacing the first coupling device in a first direction,
   wherein the second actuator is configured to control the second coupling device from the disengaged state to the engaged state by displacing the second coupling device in the first direction, and
   wherein the main coupling device is arranged to assume the engaged state by being displaced in the first direction.

7. The arrangement according to claim 6, wherein the main coupling device is biased in a second direction being opposite to the first direction.

8. The arrangement according to claim 1, further comprising:
   a first transmission member and a second transmission member each being connected to the main transmission member,
   a first shaft connected to the first power take-off unit, and
   a second shaft connected to the second power take-off unit,
   wherein the first coupling device is configured to connect the first power take-off unit to the main transmission member by connecting the first transmission member to the first shaft, and
   wherein the second coupling device is configured to connect the second power take-off unit to the main transmission member by connecting the second transmission member to the second shaft.

9. The arrangement according to claim 8, wherein the main transmission member, the first transmission member and the second transmission member each comprises a gear wheel.

10. The arrangement according to claim 8, wherein the input shaft, the first shaft and the second shaft are arranged in parallel.

11. The arrangement according to claim 8, wherein at least a portion of the input shaft is arranged between the first shaft and the second shaft.

12. The arrangement according to claim 8, wherein the first coupling device is slidably arranged at the first shaft, the second coupling device is slidably arranged at the second shaft and the main coupling device is slidably arranged at the input shaft.

13. The arrangement according to claim 1, wherein the main coupling device and the first and second coupling devices each comprises a dog clutch.

14. A powertrain for a vehicle, comprising: a power source and a transmission, wherein the power source is configured to provide motive power to the vehicle via the transmission, and wherein the powertrain comprises a power take-off arrangement according to claim 1, wherein the input shaft of the power take-off arrangement is connected to a shaft of the powertrain.

15. A vehicle comprising: wheels and a powertrain according to claim 14.

* * * * *